United States Patent [19]
Partridge, III

[11] Patent Number: 5,473,681
[45] Date of Patent: Dec. 5, 1995

[54] METHOD FOR USE IN COMPLETING TELEPHONE CALLS

[75] Inventor: B. Waring Partridge, III, Mendham, N.J.

[73] Assignee: AT&T Corp., Murray Hill, N.J.

[21] Appl. No.: 86,975

[22] Filed: Jul. 2, 1993

[51] Int. Cl.⁶ .................................................. H04M 7/00
[52] U.S. Cl. ...................... 379/229; 379/201; 379/220; 379/221; 379/216
[58] Field of Search ................................. 379/220, 221, 379/229, 201, 210, 211, 212, 216

[56] References Cited

U.S. PATENT DOCUMENTS

| | | | |
|---|---|---|---|
| 4,555,594 | 11/1985 | Friedes et al. | 379/220 |
| 4,565,903 | 1/1986 | Riley | 379/220 |
| 4,577,066 | 3/1986 | Bimonte | 379/220 |

OTHER PUBLICATIONS

An Overview of Signaling System No. 7, by G. Gary Schlanger, IEEE J. on Selected Areas in Comm. vol. SAC-4, No. 3, May 1986.

Common channel signaling based on CCITT System No. 7, by Hlawa et al., Telephony, Feb. 9, 1981.

Demystifying SS7 Architecture, by William Stallings, Telecommunications, Mar. 1989.

Primary Examiner—Jeffery A. Hofsass
Assistant Examiner—Scott Wolinsky
Attorney, Agent, or Firm—Eugene J. Rosenthal

[57] ABSTRACT

The indication may be transmitted as a signaling system 7 (SS7) message, or a portion thereof. The LEC may also provide an indication that the carrier whose access code was entered was not the carrier to which the calling telephone line was PIC'd. Advantageously, using the transmitted indication, an IXC can determine the number of instances in a predetermined time period that calls were placed using its access code, thereby verifying of the effectiveness of its advertisements for use of the access code.

11 Claims, 7 Drawing Sheets

| SUBSCRIBER'S TELEPHONE LINE | FORWARDING TELEPHONE NUMBER | PIN |
|---|---|---|
| (201) 234-5678 | (201) 234-5678 | 1234 |
| ○ | ○ | ○ |
| ○ | ○ | ○ |
| ○ | ○ | ○ |
| (408) 345-6789 | (212) 998-3844 | 5678 |
| (408) 456-7891 | (800) 555-9292 | 9876 |
| ○ | ○ | ○ |
| ○ | ○ | ○ |
| ○ | ○ | ○ |
| (500) 123-4567 | (500) 123-4567 | 5432 |
| ○ | ○ | ○ |
| ○ | ○ | ○ |
| ○ | ○ | ○ |
| (908) 123-4567 | (708) 707-9999 | 1013 |

TERMINATING NUMBER  341

| (201) 123-4567 |
| (201) 234-5678 |
| ⋮ |
| (201) XXX-XXXX |
| (408) 345-6789 |
| (408) 456-7891 |
| ⋮ |
| (408) XXX-XXXX |
| (500) 123-4567 |
| ⋮ |
| (500) XXX-XXXX |
| (908) 123-4567 |
| (908) 567-8912 |
| ⋮ |
| (908) XXX-XXXX |

METHOD FOR USE IN COMPLETING TELEPHONE CALLS

TECHNICAL FIELD

This invention relates to the processing of telephone calls that are carried by more than one telephone service provider, and more particularly, to processing telephone calls when the carrier other than the initial service provider that carries a particular call may be selected either directly by the caller entering selection information on a per call basis or by "default", i.e., without the caller entering any information on a per call basis.

BACKGROUND OF THE INVENTION

In the United States, telephone service is provided by multiple providers or carriers. Some calls are handled by one service provider, e.g., a local call completed between two wired telephone stations. Other calls, e.g., long-distance calls, require multiple service providers to cooperate for their completion.

The initial carrier providing telephone service is a local service provider, illustratively a local exchange carrier (LEC), such as New Jersey Bell, but also including cellular (wireless), cable and any so-called "dial-tone provider" or "first contact service provider", all such being referred to herein as local service providers. The second carrier is typically, but not necessarily, a long-distance-or so-called inter exchange-telephone carrier. For example, presently, for a long-distance telephone call between wired telephone subscribers, the local service providers serving the calling and called telephones are LECs which are interconnected by a long-distance, or interexchange, carrier (IXC). In the United States, AT&T, MCI and Sprint are three such IXCs. In another example, for a local call from a mobile telephone to a wired telephone station, the local service provider is a cellular service provider while the second carrier could be a LEC that is connecting the network of the cellular service provider to a called party at the wired telephone station. Thus, it is possible for a telecommunications carrier to serve multiple roles, e.g., being the local service provider for some calls while being a second carrier for other calls.

Each telephone subscriber of a local service provider has associated with his telephone service a presubscribed default second carrier that was selected by or for the subscriber. The presubscribed default second carrier carries multiple-carrier calls originated from the subscriber's telephone unless the local service provider is instructed otherwise by way of the call-by-call entry of a telecommunications carrier code indicating which telecommunications carrier should carry the particular call. For any call for which a telecommunications carrier code is not entered, the default second carrier is typically identified based on the particular telephone link-illustratively represented herein by a wired telephone line but also including wireless (cellular), fiber optic or cable connections and any other link provided to connect telephones to local service providers-on which the local. service provider received the call.

Continuing with the above-described interexchange call example, which represents the most common scenario at present, each subscriber to local telephone service from a LEC has associated with his telephone line a "primary interexchange carrier," or PIC. The local subscriber is said to be "PIC'd" to the associated IXC. The interexchange carrier to which a subscriber is PIC'd will be used by default to complete interexchange calls originated from his telephone line unless the LEC is instructed otherwise. Such instruction is given when the subscriber enters, on a call-by-call basis, prior to dialing the called telephone number, a telecommunications carrier code, illustratively an IXC access code, corresponding to the desired IXC. One such IXC access code is "10 2 8 8" (10 A T T) corresponding to AT&T.

Specifically, when a long-distance call is initiated by the subscriber from his telephone line, and no access code is entered prior to the dialing of the called telephone number, the call is routed through the network of the originating subscriber's LEC, over the network of the PIC'd IXC and, ultimately, through the network of the LEC which has as one of its subscribers the terminating subscriber. Alternatively, a subscriber may initiate a long-distance call by dialing, prior to supplying the called telephone number, an IXC access code that indicates which of the IXCs he wishes to carry his call. Upon receipt of the access code by a switch of the LEC serving the caller, it is recognized that the caller wishes his call to be carded over the IXC corresponding to the received access code. Accordingly, the LEC routes the caller's call to a trunk connecting the LEC to the IXC indicated by the access code, regardless of the IXC to which the caller's telephone line is PIC'd. Thereafter, the LEG passes the called telephone number to the selected IXC. It is noted that the supplying of an IXC access code typically indicates the selection by the caller of an IXC other than the one that he is PIC'd to, but occasionally it may indicate the same IXC to which the caller is PIC'd.

SUMMARY OF THE INVENTION

According to prior art arrangements, the information indicating whether a call was routed to a particular telecommunications carrier because a telecommunications carrier code was supplied by the caller, as opposed to the caller having selected that particular telecommunications carrier by default, is never conveyed to the particular telecommunications carrier. I have recognized, however, that such information could prove useful and valuable to a telecommunications carrier, especially in the area of providing special services. Therefore, in accordance with the principles of the invention, if a telecommunications carrier code specifying a particular telecommunications carrier is supplied by a caller, the network of the local service provider routing such a call to the specified telecommunications carrier is arranged to transmit to the network of the selected telecommunications carrier an indication that a telecommunications carrier code was supplied by the caller to the local service provider. Moreover, the local service provider may also provide an indication that the carrier whose telecommunications carrier code was entered is not the carrier that would have been selected by default for the calling telephone.

In the IXC context, if an access code specifying an IXC is supplied by a caller, the network of the LEC routing such a call to the specified IXC is arranged to transmit to the network of the IXC an indication that an access code was supplied by the caller to the LEC. Advantageously, the indication is transmitted as a signaling system 7 (SS7) message, or a portion thereof. The LEC may also provide an indication that the carrier whose access code was entered is not the carrier to which the calling telephone is PIC'd.

DETAILED DESCRIPTION

The invention particularly relates to long-distance-or so-called interexchange-calls, which involve the use of the facilities of a long-distance, or interexchange, carrier, also referred to as an IXC. In the United States, for example, AT&T, MCI and Sprint are three such IXCs. Each subscriber to local telephone service from a local exchange carrier, or LEC, such as New Jersey Bell, has associated with his telephone line a "primary interexchange carrier," or PIC, that was selected by or for the local subscriber. The local subscriber is said to be "PIC'd" to the associated IXC.

When a subscriber initiates a long-distance call without entering any access code that identifies an IXC, the call is routed through the network of the originating subscriber's LEC, over the network of the PIC and, ultimately, through the network of the LEC which has as one of its subscribers the terminating subscriber. Similarly, if a subscriber initiates a long-distance call and prefixes the terminating telephone number by an access code that identifies an IXC, the call is routed through the network of the originating subscriber's LEC, over the network of the IXC specified by the access code and, ultimately, through the network of the LEC which has as one of its subscribers the terminating subscriber. It is possible for some calls to be originated from a telephone line using the IXC access code that specifies the same IXC as the one to which the telephone line is PIC'd.

An IXC receiving a call from a LEC, according to the prior art, does not know if the call was routed to the IXC because the subscriber's telephone was PIC'd to that IXC or if the subscriber dialed an IXC access code to reach the IXC. In accordance with the principles of the invention, if an access code specifying an IXC was entered by a caller, the network of the LEC routing such a call to the specified IXC is arranged to transmit to the network of the IXC an indication that an access code was entered. The network of the IXC so accessed may then process such a call differently than if the call was routed to the IXC network because the subscriber's telephone line was PIC'd to the IXC.

Figure 1:
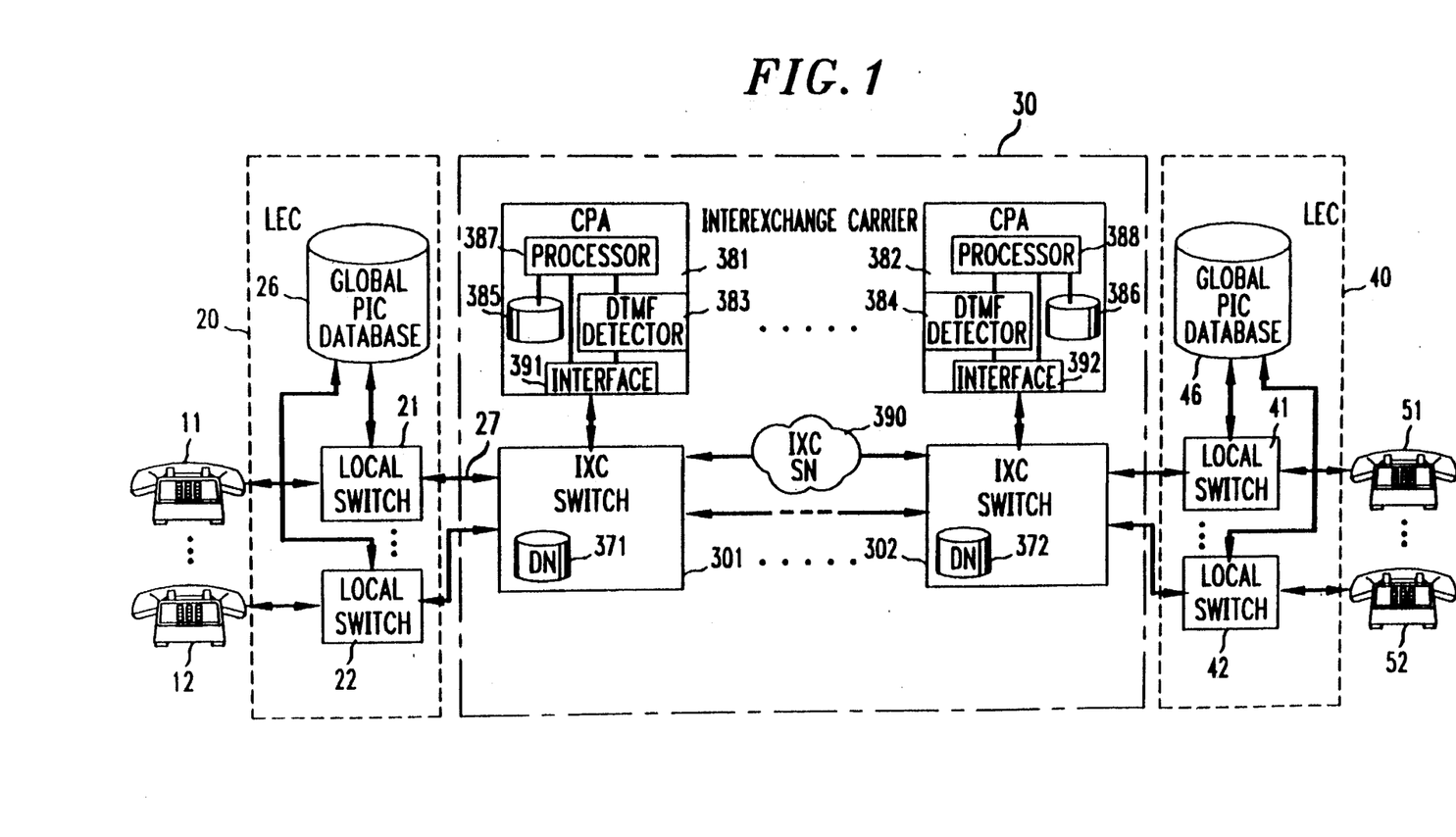
FIG. 1 shows an exemplary system for completing calls in accordance with the principles of the invention.

In FIG. 1, a plurality of telephone subscribers 11 . . . 12 are provided with local exchange service by local exchange carrier (LEC) 20. LEC 20 includes a plurality of local central office switches 21 . . . 22 which serve respective ones of the subscribers. When a long-distance call is originated by one of the subscribers, say subscriber 11, the associated local switch 21 recognizes from the dialed telephone number-specifically the area code thereof—that this is, indeed, a long-distance call. As a part of the processing of this call, if no IXC access code is dialed, switch 21 accesses data base 26 in which is stored an identification of the primary interexchange carrier, or PIC, for each of the LEC's subscribers, as in the prior art. Inasmuch as data base 26 has PIC information relating to all the interexchange carriers, or IXCs, to which it has access, the data base is referred to herein as the "global" PIC data base.

In this example, subscriber 11 is PIC'd to IXC 30. That is, IXC 30 is that subscriber's selected primary interexchange carrier. IXC 30 includes a network of interexchange carrier switches which are illustratively AT&T 4ESS™ switches. The call is routed by local switch 21 to IXC 30 over link 27 and, more particularly, to originating switch 301 therein. In one embodiment of the invention, link 27 contains all that is necessary to achieve a voice connection and a signaling connection between local switch 21 and originating switch 301. Within the network of IXC 30, the call is ultimately routed to IXC terminating switch 302. In being carded over the network, the call may have also been directed, for example, across various trunks and through various switching nodes (not shown), as is well known in the art.

Figure 2:
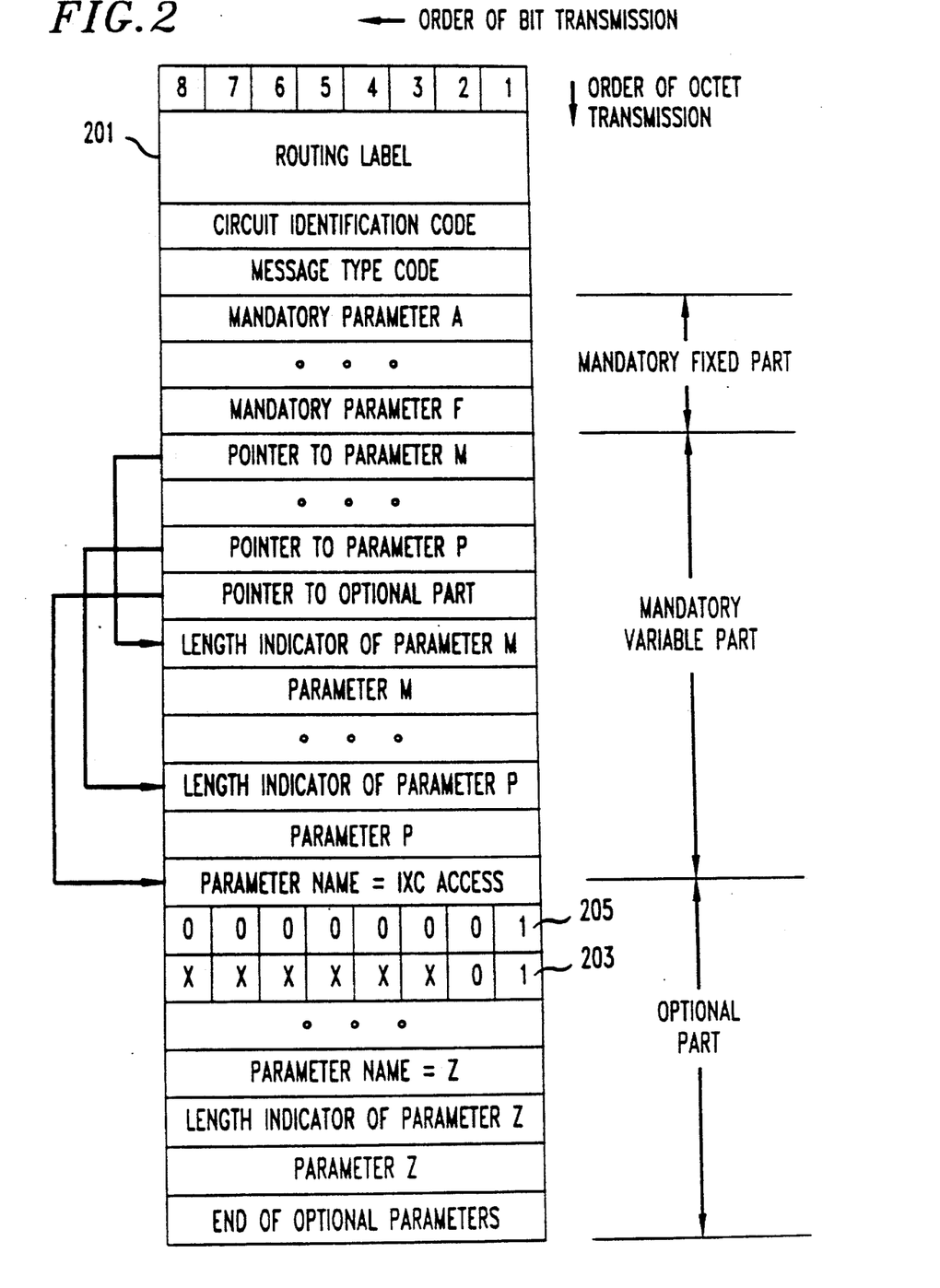
FIG. 2 shows an exemplary SS7 ISUP (ISDN User Part) IAM (Initial Address Message) where the indication that an IXC access code was dialed is conveyed as bit 1 of an IXC access parameter field, in accordance with the principles of the invention.

If an IXC access code is dialed, e.g., the access code for IXC 30, local switch 21 of LEC 20 routes the call to IXC switch 301, as before. However, in addition to any communications between local switch 21 and IXC switch 301 that were required by the prior art, local switch 21 also transmits to IXC switch 301, in accordance with the principles of the invention, an indication that the IXC access code for IXC 30 was dialed. In one embodiment of the invention, the indication is transmitted as a signaling system 7 (SS7) message. FIG. 2 shows an exemplary SS7 ISUP (ISDN User Part) IAM (Initial Address Message) 201 where the indication that an IXC access code was dialed is conveyed as bit 1 in IXC access parameter field 203, in accordance with the principles of the invention. It is noted that the IXC access parameter is not a parameter that is presently defined as pan of the SS7 message set.

In a further embodiment of the invention, local switch 21 also transmits an indication that IXC 30 was not the IXC to which the telephone line of subscriber 11 was PIC'd if such is the case. Local switch 21 can determine this information by comparing the carrier corresponding to the dialed IXC access code against the IXC stored in global PIC database 26 for the telephone line of subscriber 11. Such an indication is embodied in bit 2 of IXC access parameter field 203 of SS7 ISUP (ISDN User Part) IAM (Initial Address Message) 201 shown in FIG. 2. If the bit is set to a 0, as shown, this indicates that the IXC carrying the call was not the IXC to which the telephone line of the subscriber originating the call was PIC'd. If the bit is set to a 1, this indicates that the IXC carrying the call was the IXC to which the telephone line of the subscriber originating the call was PIC'd. Field 205 is the length indicator for IXC access parameter field 203. The remaining bits of access parameter field 203 are each marked with an x to indicate that their values are not considered and that they are reserved for future use.

Those skilled in the art will know how to develop an indication for embodiments of the invention using multi-frequency (MF) signaling, which is the signaling employed by an older interface used to connect a LEC to an IXC when there is no SS7 connection between them. In either embodiment, the indicators may be transmitted from originating IXC switch 301 to terminating IXC switch 302 over IXC signaling network (SN) 390 as SS7 messages.

Also shown in FIG. 1 is LEC 40 which has as one of its subscribers the subscriber to which the call in question is being directed. Similar to LEC 20, LEC 40 includes local switches 41 . . . 42 which serve respective LEC subscribers 51...52, as well as a global PIC data base 46, which is used when outgoing long distance calls are made by subscribers 51...52. In this example, the terminating subscriber is subscriber 51.

IXC switches 301 and 302 are interfaced to respective ones of common platform adjuncts (CPAs) 381 . . . 382. CPAs are processors designed to supplement the functionality available with already existing IXC switches so that together they can provide features and services that such switches could not otherwise provide without significant redesign. One such service, the "follow me anywhere" service, permits a subscriber to supply an IXC with the telephone number of a telephone line to which calls to the subscriber's telephone line should be directed if the caller placing a call to the subscriber's telephone line prefixes the call with the access code of the IXC. It is noted that new switches could be designed to have the functionality of a common platform adjunct built in.

CPA 382, an exemplary CPA, contains processor 388, which controls the operation of the CPA, connected to dual tone multi-frequency (DTMF) detector 384, data base 386 and interface 392. Interface 392 includes terminations for both voice channels and a signaling channel that pass between CPA 382 and IXC switch 302. In one embodiment, the connection between CPA 382 and IXC switch 302 is an Integrated Services Digital Network (ISDN) Primary Rate Interface (PRI) which provides 23 voice (B) channels and one data (D) channel associated with the voice channels. Optionally, interface 392 can supply alerts, e.g., tones or voice messages, over the voice channels. Interface 392 is connected to dual tone multi-frequency (DTMF) detector 384. Dual tone multi-frequency (DTMF) detector 384 can detect and transmit to processor 388 a decoded value for dual tone multi-frequency signals received on the channel terminated at interface 392. Interface 392 communicates messages between IXC switch 382 and CPA 382 to and from processor 388.

Figure 3:
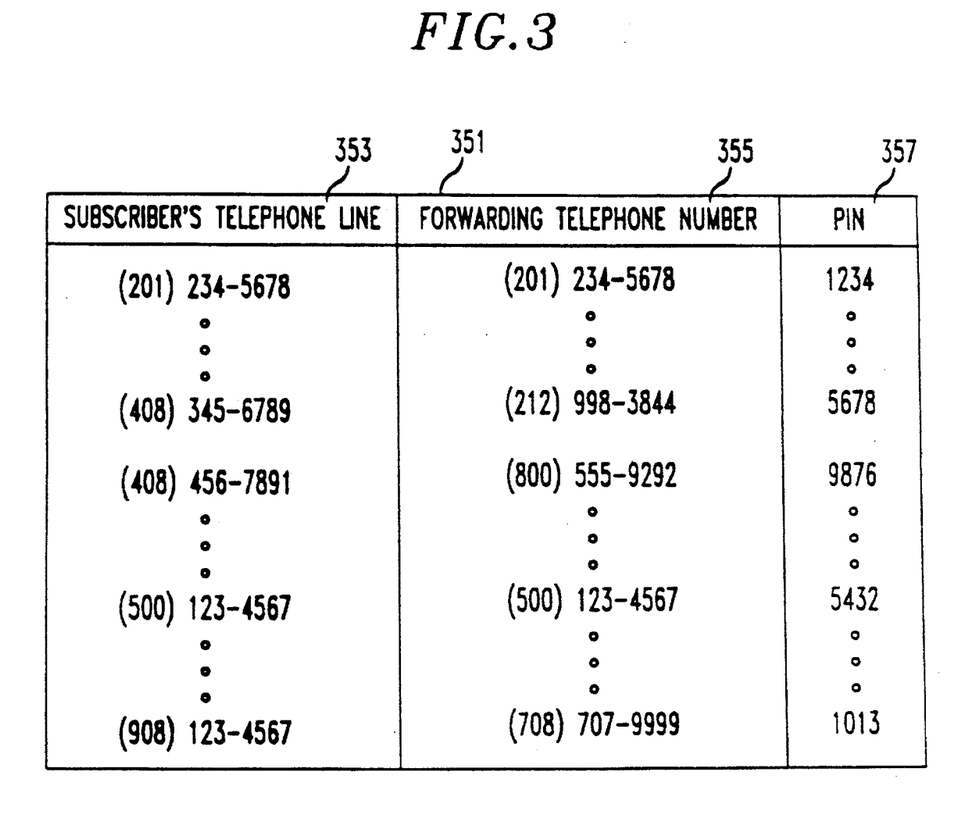
FIG. 3 shows an exemplary "follow me anywhere" table in which is stored the information necessary to create an association between a subscriber's telephone number and a telephone number of a telephone line to which the subscriber wishes his calls to be routed to by the "follow me anywhere" service.

FIG. 3 shows exemplary "follow me anywhere" table 351 in which is stored the information necessary to create an association between a subscriber's telephone number, stored in subscriber telephone number field 353, and a telephone number of a telephone line to which the subscriber wishes his calls to be routed by the "follow me anywhere" service, stored in forwarding telephone number field 355. A personal identification number (PIN) may be stored for each subscriber in PIN field 357 to be used in verifying his authority to change the telephone number stored in forwarding telephone number field 355. If a subscriber's telephone number is not found listed in field 353, then he has not subscribed to the "follow me anywhere" service, although there may be other services provided by CPA 382 to which he has subscribed.

Figure 4:
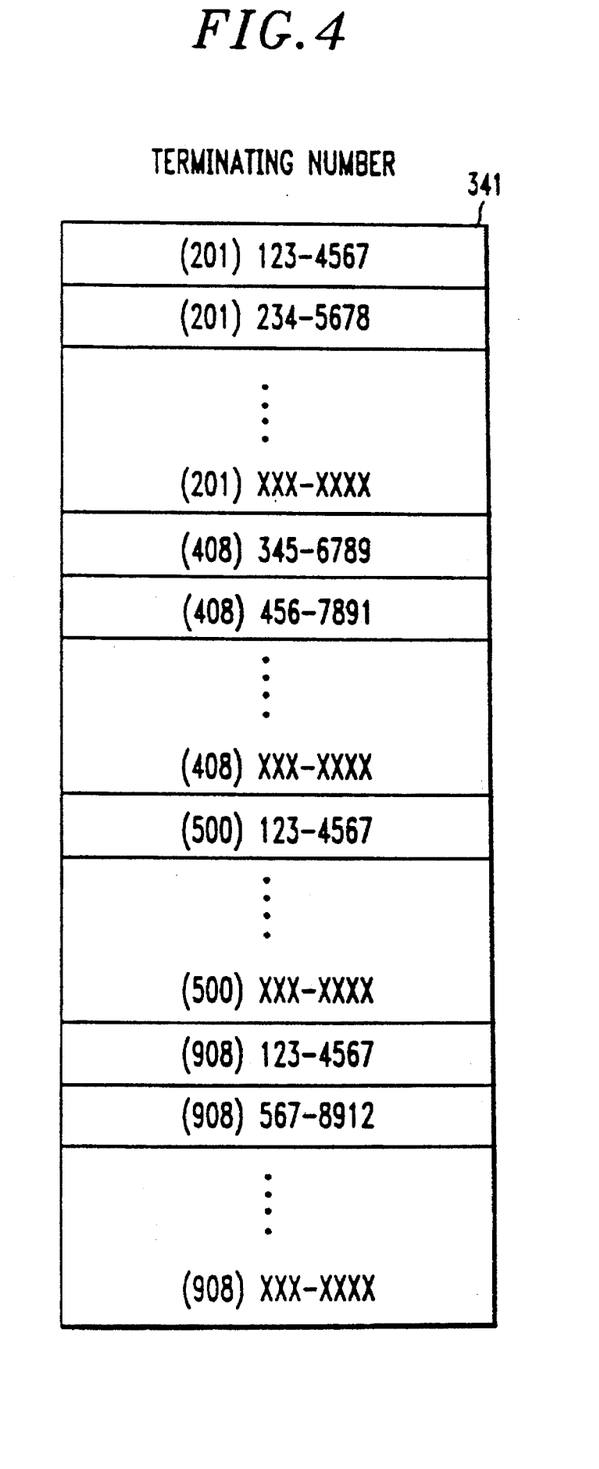
FIG. 4 shows an exemplary DN trigger table, for use in the system of FIG. 1, in which the telephone numbers of feature, or service, subscribers arc listed in numerical order by area code and number.

Each IIXC switch has, for use when it is a terminating switch, a respective one of destination number (DN) trigger tables 371 . . . 372 in which are listed the telephone numbers of subscribers who subscribe to features or services that require a common platform adjunct (CPA) to provide at least some functionality for their implementation. FIG. 4 shows an exemplary DN trigger table in which the telephone numbers 341, colloquially also known as the automatic number identification (ANI), of feature or service subscribers are listed in numerical order by area code and number. XXX–XXXX is a representation indicating the last number stored for any particular area code. It is noted that presubscription is not necessary if all calls terminated by IXC switch 302 are routed to CPA 382 and if any subscriber is permitted to store a telephone number in forwarding telephone number field 355.

For the call placed from subscriber 11 to subscriber 51, IXC terminating switch 302 tests to determine if the telephone number of subscriber 51 is listed in its DN trigger table. If the terminating subscriber number is not listed, IXC terminating switch 302 routes the call to local switch 41 which, in turn, passes the call to the telephone line of its terminating subscriber 51 whether or not an IXC access code was dialed. A connection between subscribers 11 and 51 is thus made, the connection including both LECs and the IXC, as is typical in the prior art.

However, if the terminating subscriber number is listed in DN trigger table 372 of IXC terminating switch 302, then IXC terminating switch 302 queries CPA 382 by sending it 1) the so-called calling party number (CPN), i.e., the telephone number (ANI) of the terminating subscriber, and 2) an indication that the call was placed using an IXC access code, if the switch received such an indication. CPA 382 looks up the features and services that it is to provide for the terminating party number. If "follow me anywhere" service is to be provided, as indicated by an entry for the terminating party number in subscriber's telephone line field 353 of "follow me anywhere" association table 351 (FIG. 3), CPA 382 determines 1) if the call was placed using an IXC access code and 2) if, for the called subscriber, the telephone number of a telephone line other than his telephone line has been stored. If neither or only one of the conditions are met, the call is completed to the subscriber's line, as is typical in the prior art. However, if both conditions are met, CPA 382 provides to IXC terminating switch 302 with the associated telephone number stored in forwarding telephone number field 355. IXC terminating switch 302 then causes the call to be routed through the IXC network to an IXC switch connected to the LEC serving the telephone line indicated by the stored telephone number. CPA 382 also informs IXC terminating switch 302 that it should begin billing the telephone account of the called subscriber for the cost of the additional portion of the call necessitated by the use of the "follow me anywhere" service. The manner in which the telephone number is stored in forwarding telephone number field 355 for use with the "follow me anywhere" service will be described further below.

Figure 5:
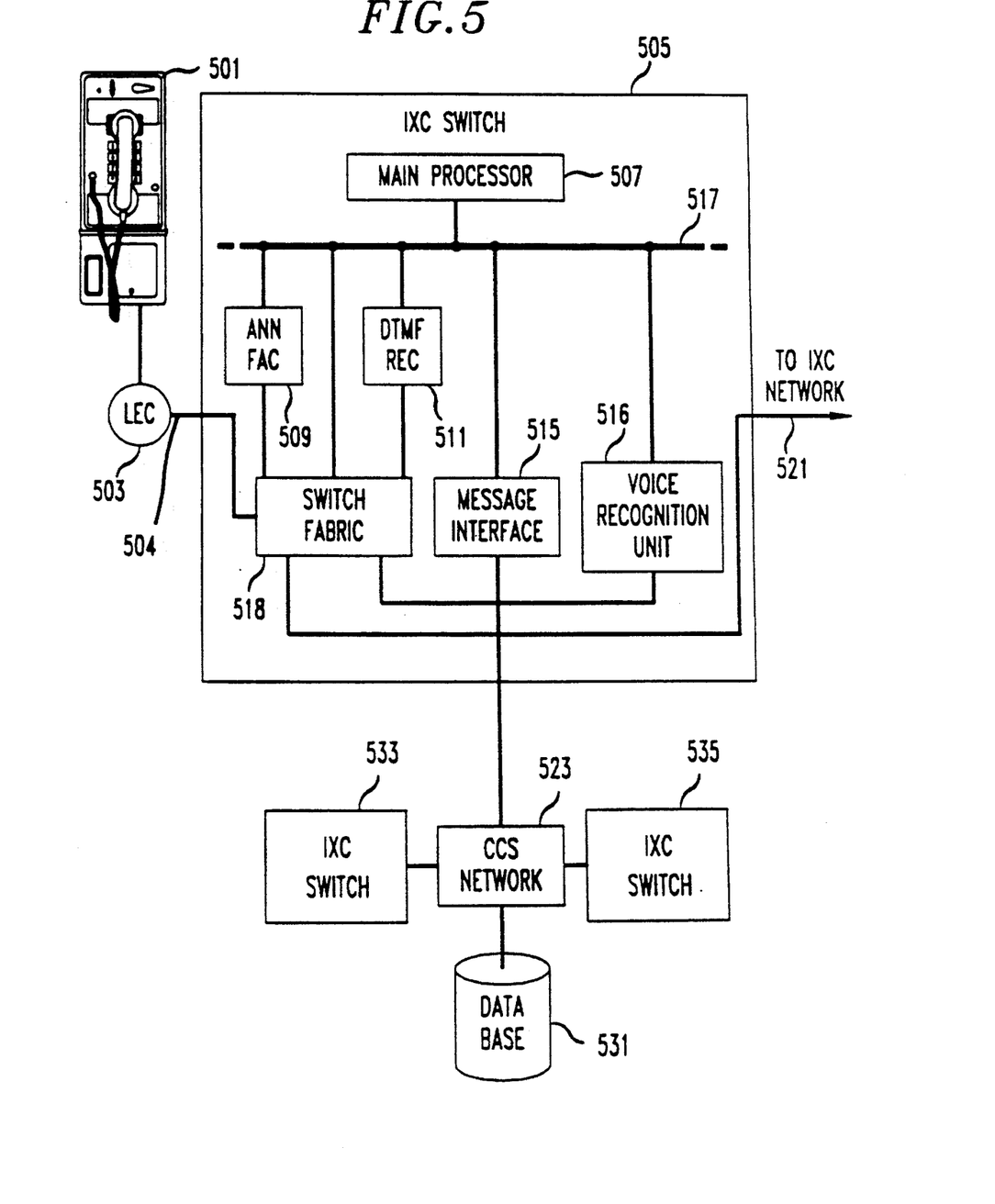
FIG. 5 shows another embodiment of the invention, in which the information used with the "follow me anywhere" service is stored in a centralized data base within the network of an interexchange carrier (IXC)

FIG. 5 shows another embodiment of the invention, in which the information used with the "follow me anywhere" service is stored in a centralized data base, e.g., a well known network control point (NCP) within the network of an interexchange carrier (IXC). Shown are a) telephone station 501, from which calls may be originated, b) local exchange carrier (LEC) 503, c) IXC switches 505, 533 and 535, with IXC switch 505 being shown in greater detail, d) CCS network 523 and e) data base 531.

IXC switch 505 includes: a) main processor 507, b) announcement facility (ANN FAC) 509, c) dual tone multi-frequency receiver (DTMF REC) 511, d) message interface 515, e) bus 517, f) switch fabric 518 and g) voice recognition unit 516. Main processor 507 controls the overall operation of IXC switch 505 by performing any necessary processing and exchanging messages with the other components of IXC switch 505 over bus 517. Announcement facility (ANN FAC) 509 can present various announcements which can be heard by the calling party. The announcements, or combinative portions thereof, are prestored in announcement facility (ANN FAC) 509 and accessed by supplying announcement facility (ANN FAC) 509 with pointers to the announcements. Dual tone multi-frequency receiver (DTMF REC) 511 receives dual tone multi-frequency signals that are transmitted in response to the pressing of keys on the keypad of telephone station 501 and supplies the digit corresponding to each pressed key to main processor 507.

Message interface 515 is a protocol conversion unit that permits IXC switch 505 to communicate with a common channel signaling (CCS) network, such as CCS network 523. It is responsible for formatting all messages transmitted to CCS network 523 and for extracting responses received from CCS network 523. Other IXC switches, such as IXC switches 533 and 535, may also route messages via CCS network 523 to data base 531.

Switch fabric 518 can connect the trunk on which the calling party's call arrived at IXC switch 505, e.g., trunk 504, to a) announcement facility (ANN FAC) 509 b) dual tone multi-frequency receiver (DTMF REC) 511, c) voice recognition unit 516 or d) to the rest of the interexchange carrier's network, via link 521. The purposes of such connections are described further below.

Given the description above, IXC switch 505 can be designed by those skilled in the art to receive a message indicating that an IXC carrier code was entered and, if so, to provide the "follow me anywhere" service.

Figure 6:
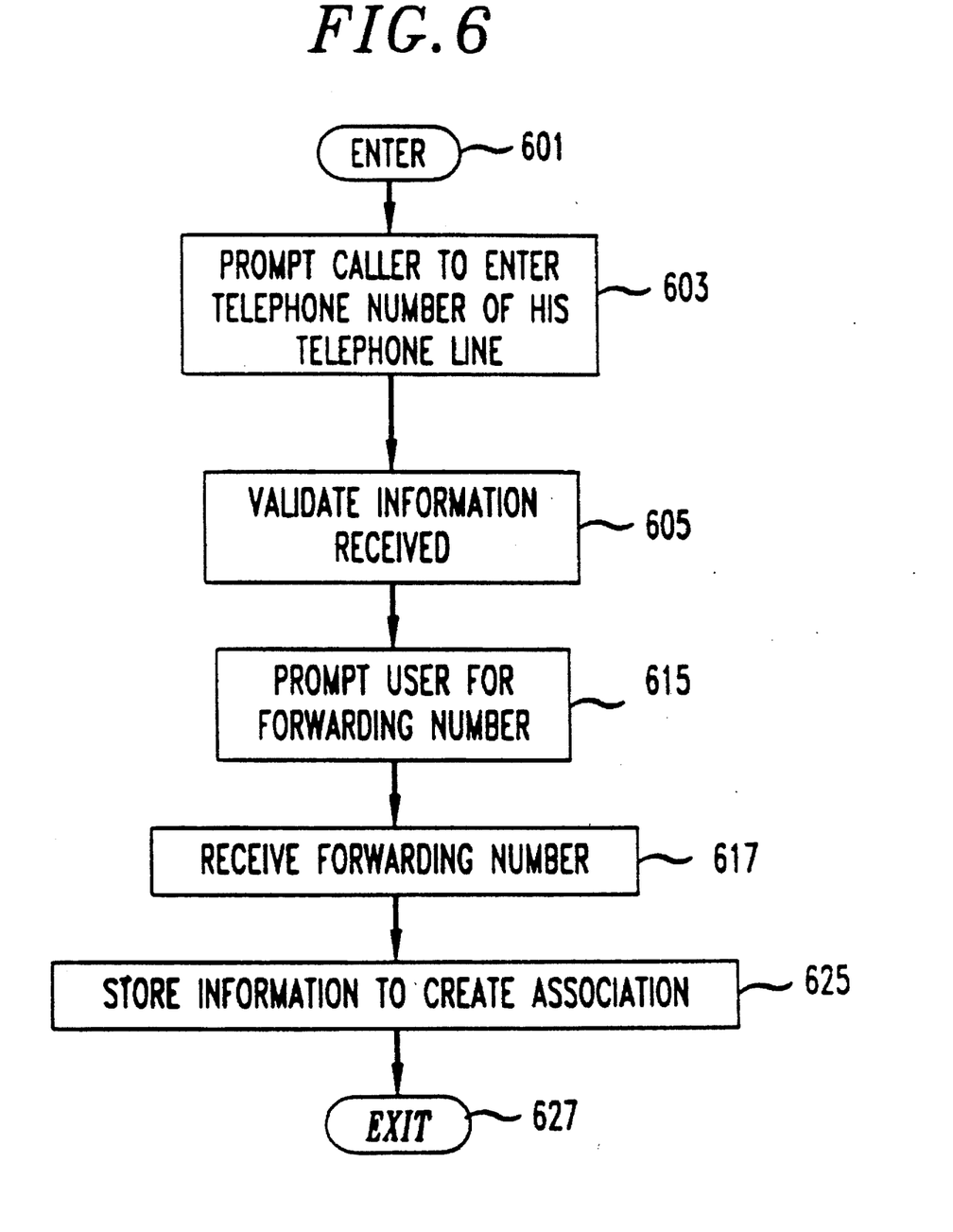
FIG. 6 shows a flow chart of an exemplary process by which a subscriber stores the telephone number of a telephone line to which he wants calls placed to his telephone number to bc routed in a data base.

FIG. 6 shows a flow chart of an exemplary process by which a subscriber stores the telephone number of a telephone line to which he wants calls placed to his telephone number to be routed in a data base, e.g. data base 386 (FIG. 1) or data base 531 (FIG. 5). The process will be described in terms of the apparatus shown in FIG. 5, although the same steps are applicable to the apparatus shown in FIG. 1. Therefore, from the description of the process hereinbelow, those skilled in the art will know how to apply the method to the apparatus shown in FIG. 1.

The process is entered in step 601 (FIG. 6) when IXC switch 501 receives an indication that a telephone number for "follow me anywhere" service is to be stored. Such an indication may be a call to a particular predetermined telephone number. For example, a caller at telephone station 501 (FIG. 5) may signal that he wishes to establish an association by placing a call to an 800-type number specified by the interexchange carrier.

LEC 503 recognizes from the particular 800-type number dialed by the caller that the call is to be carried by a particular IXC and, therefore, it forwards the call to IXC switch 505 of that IXC. IXC switch 505 recognizes that the particular 800-type number that was dialed is one that must be forwarded to and processed by data base 531. Therefore, it transmits a message containing the dialed number to data base 531. The message is sent via message interface 515 and CCS network 523. Data base 531 recognizes that the dialed number is the telephone number indicating that a new telephone number for the "follow me anywhere" service is to be stored and it, therefore, begins a session to obtain and store the necessary information.

Next, in step 603 (FIG. 6), the caller is prompted to enter the telephone number of his telephone line. All prompting is performed by IXC switch 505 (FIG. 5) causing announcement facility (ANN FAC) 509 to play appropriate announcements to the caller. The particular prompt supplied at any point in the process, unless otherwise specified, is the one indicated in a message received from data base 531. Switch fabric 518 connects the caller's call on trunk 504 to announcement facility (ANN FAC) 509 so that the caller may hear the prompts.

By pressing keys at telephone station 501, the caller supplies his responses to the prompts in the form of dual tone multi-frequency (DTMF) signals. To receive and decode the dual tone multi-frequency (DTMF) signals supplied by the caller, dual tone multi-frequency receiver (DTMF REC) 511 is connected to the caller's call, via switch fabric 518. Messages corresponding to the decoded received signals are transmitted to data base 531 via message interface 515 and CCS network 523. In an alternative embodiment, the caller could supply his responses to the prompts in the form of speech which is received and decoded by voice recognition unit 516.

The information received from the caller is validated in step 605 (FIG. 6). This step is performed by determining if the telephone number supplied is one that is subscribed to the "follow me anywhere" service. Such a determination may be made by data base 531 (FIG. 5). Entry of a valid PIN may also be required of the subscriber before he is permitted to store a new telephone number for the "follow me anywhere" service. Next, in step 615, the caller is prompted to enter the telephone number of the telephone station to which calls placed to his telephone line should be routed, i.e., the forwarding number. In step 625, data base 531 stores the received information so as to associate the subscriber's telephone line with the supplied forwarding telephone number. The process is then exited in step 627.

Figure 7:
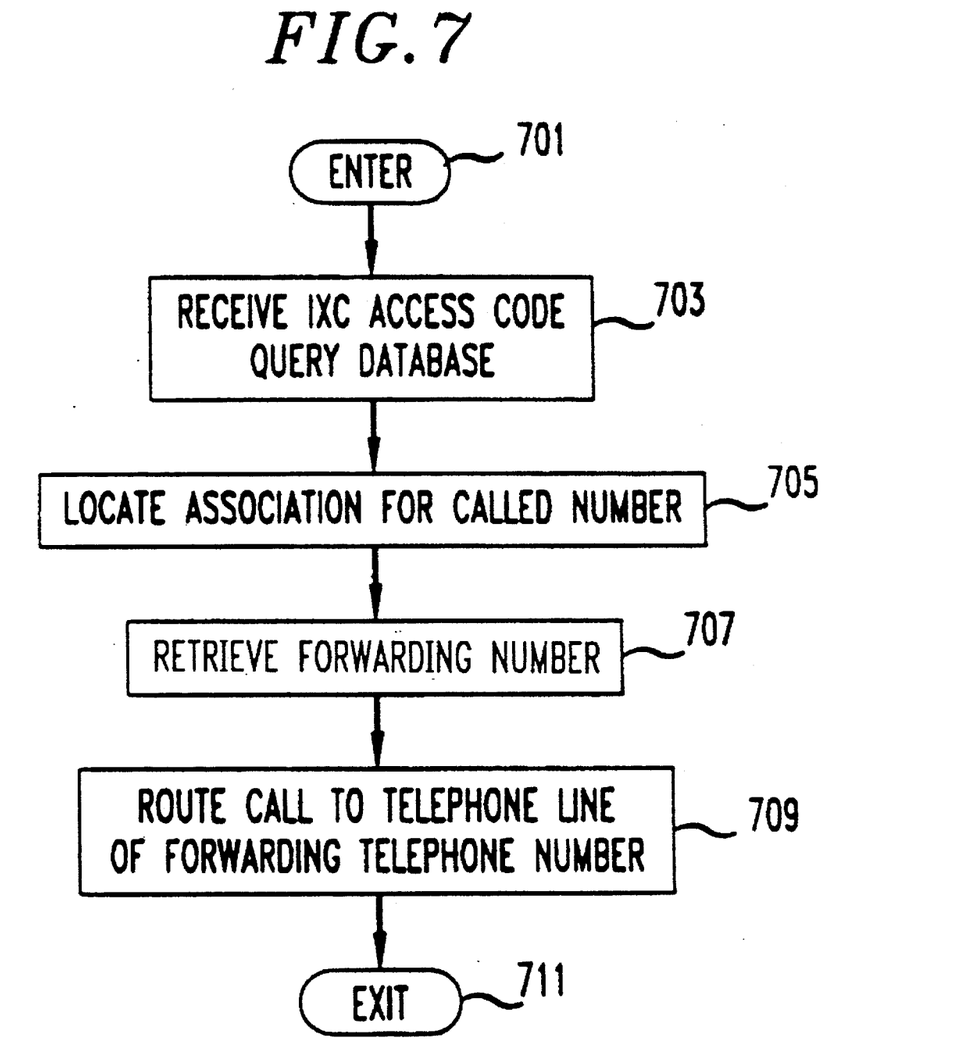
FIG. 7 shows a flowchart of a process, for using the "follow me anywhere" service so that a caller may make a call and have it forwarded to the called person when an association has been made in a data base within the network of a carrier as described in FIG. 6.

FIG. 7 shows a flowchart of a process, for using the "follow me anywhere" service so that a caller may make a call and have it forwarded to the called person when an association has been made in a data base within the network of a carrier as described in FIG. 6. The process is entered in step 701 when a calling party originates a card call at a telephone station for which an association has been established, e.g., telephone station 501 (FIG. 5), by a) dialing 1+ area code + number or b) access code +1 + area code + number. A switch of local exchange carrier (LEC) 503 receives the dialed digits and recognizes that the call is an IXC type of call. Therefore, local exchange carrier (LEC) 503 will route the call to an IXC switch for further handling.

If an access code for a specific interexchange carrier (IXC) is not specified as part of the digits dialed by the calling party, but yet the call must be carded by an interexchange carrier, local exchange carrier 503 routes the call over a trunk, e.g., trunk 504, to IXC switch 505 of an interexchange carrier. Local exchange carrier 503 is aware of a default interexchange carrier to which telephone station 501 has been assigned. If the dialed digits include an access code specifying a particular interexchange carrier, local exchange carrier 503 routes the call over a trunk to an IXC switch 505 of the specified interexchange carrier. Furthermore, in accordance with the principles of the invention, local exchange carrier (LEC) 503 signals to IXC switch 505 that an access code was dialed by the caller, if one was dialed.

In step 703 (FIG. 7), IXC switch recognizes the call as having been dialed using an IXC access code and it queries data base 531 (FIG. 5) by sending it the called number. Data base 531 recognizes that the call is one that is a candidate for the "follow me anywhere" service, based on the called subscriber's number. Data base 531 locates the association for the received called subscriber number stored using the process shown in FIG. 6, if there is one, in step 705. Next, the stored forwarding telephone number of the telephone station is retrieved in step 707 by employing the association between the telephone number of the telephone line of the stored subscriber and the forwarding telephone number. The call is routed to the telephone line indicated by the forwarding telephone number in step 709 and the process then exits in step 711. It is noted that only calls 1 ) placed over a carrier in which was previously stored an association between the telephone line of the called party and another telephone line and 2) for which an access code was dialed, can use the "follow me anywhere" service.

It is noted that in the discussion of FIG. 1 it was mentioned that the called party would pay for any additional charges that resulted because of the forwarding. However, there is no reason that the calling party could not be made to pay for the entire cost of a call even if it were forwarded to a different telephone line than the calling party expected to reach. This would be achieved by substituting the forwarding number for the dialed number in the billing record of the call.

The indication that an IXC access code was entered can be used to trigger services other than the above-described "follow me anywhere" service. For example, a discount may be offered to all callers who use an IXC access code in placing their IXC calls.

Additionally, call information other than the called telephone number may be used, along with the indication that an IXC access code was entered, to trigger such other services. For example, if a call was dialed from a non-pay telephone that was PIC'd to an IXC other than the one selected by dialing its IXC access code, a particular greeting or thank you message may be supplied to the caller. Alternatively, a discount may be given by an IXC to only those callers who enter its access code and are PIC'd to that IXC, so as to provide a benefit for loyal subscribers who pay attention to its advertising. Similarly, a discount may be given by an IXC to only those callers who enter its access code and are not PIC'd to that IXC, so as to entice new users to try its service.

It may also be useful to an IXC to tally the number of telephone calls that are placed through its network using its access code. Doing so will give the IXC information concerning the effectiveness of its advertising. This information may be further broken down by the categories of the calls, or characteristics of the calls, such as, pay telephone calls, non-pay telephone calls, residential telephone calls, and business telephone calls, as well as times of calling.

In order to facilitate use of the IXC access code, it may be preprogrammed into a programmable one-touch-dialing button on the subscriber's telephone, if such buttons are available. Similarly a pay telephone can be provided with preprogrammed buttons one-touch-dialing that correspond to the access codes of various IXCs and are labeled with the names of the IXC's. A caller at such a phone simply need press the IXC's button prior to dialing the called party's number to be sure that his calls are placed over his desired IXC. The pay phone responds to the pressing of the selected IXC by dialing the access code for the selected IXC. Thereafter, the caller dials the call as in the prior art.

It is emphasized that although the foregoing example was described in terms of IXC access codes having a form of "1-0-XXX", that the invention is not so limited and that any form of telecommunications carrier code will suffice. For example, the telecommunications carrier code may be in the form of speech, namely, the speaking of the name of the particular telecommunications carrier.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. A method for use in a calling environment in which telephones of calling and called parties are connected to networks of respective local service providers and the networks of said local service providers are connected for any multiple carrier call between a calling party and a called party by one of a plurality of networks respectively associated with one of a plurality of telecommunications carriers, and where for a particular multiple carrier call the one of said telecommunications carriers to which the telephone of the calling party is presubscribed is selected by default to complete said particular multiple carrier call unless the calling party entered for that call a telecommunications carrier code specifying a selected one of said plurality of telecommunications carriers to complete said call, the method comprising the step of:

providing an indication that said calling party entered said selected telecommunications carrier's telecommunications carrier code to said selected telecommunications carrier in response to the network of the local service provider receiving both (i) a telecommunications carrier code corresponding to said selected telecommunications carrier and (ii) a destination for said particular multiple carrier call, prior to establishing a [non-signaling] voice connection from said network of said local service provider to the network of said selected telecommunications carrier.

2. The method as defined in claim 1 wherein said indication is data continaed in a SS7 message.

3. A method for use in providing information about a call from a network of a local service provider to a network of a telecommunications carrier that will further carry said call, the method comprising the step of:

supplying as part of the internetwork signaling process both (i) a signal from said network of said local service provider to said network of said telecommunications carrier indicating that said telecommunications carrier was selected to complete said call, said signal being supplied in response to entry of a telecommunications carrier code corresponding to said telecommunications carrier and (ii) at least a portion of a destination address for said call received at said network of said local service provider prior to executing said supplying.

4. A method for use in a network of a local service provider comprising the steps of:

determining in said network of said local service provider that a call to be carried by a telecommunications carrier was requested by a caller entering both (i) a telecommunications carrier code corresponding to a particular telecommunications carrier that is to carry said call and (ii) a portion of a destination address at said network of said local service provider; and transmitting a signal to a network of said particular telecommunications carrier, in response to said determination, said signal indicating that said telecommunications carrier's code was entered.

5. A method for use in a calling environment in which telephones of calling and called parties are connected to respective networks of local service providers and the networks of said local service providers are connected for any particular multiple carrier call between a calling party and called party by one of a plurality of networks respectively associated with one of a plurality of telecommunications carriers, and where for a particular multiple carrier call, a default telecommunications carrier is selected to complete said call unless the calling party entered for that call a telecommunications carrier code specifying a particular telecommunications carrier to complete said call, the method comprising the step of:

receiving at a telecommunications carrier selected by a caller an indication that said caller entered said carrier's telecommunications carrier code, said receiving of the indication being part of internetwork signaling communications which also includes at least a portion of a destination address for said call.

6. A method for use in providing information about a call from a network of a first telecommunications carrier to a network of a second telecommunications carrier that will further carry said call, the method comprising the step of:

supplying a signal from said network of said first telecommunications carrier to said network of said second telecommunications carrier indicating that said second telecommunications carrier was selected to further carry said call in response to entry of a telecommunications carrier code corresponding to said second telecommunications carrier, said supplying step being performed after said network of said first telecommunications carrier receives at least a portion of a destination address for said call.

7. A method for use in a calling environment in which telephone lines of calling and called parties are connected to respective networks of local exchange carriers and the networks of said local exchange carriers are connected for any particular long-distance call between a calling party and called party by one of a plurality of networks respectively associated with one of a plurality of interexchange carriers, and where for any long-distance call a particular one of said interexchange carriers to which the telephone line of the calling party is PIC'd is selected by default to complete said call unless the calling party dialed for that call an interexchange carrier access code specifying a particular interexchange carrier to complete said call, the method comprising the step of:

providing to an interexchange carrier that was selected to complete a call, in response to a caller having entered an interexchange access code corresponding to said interexchange carrier and at least a portion of a destination address indicating that said call is to be handled by an interexchange carrier, an indication that said caller entered said carrier's interexchange access code.

8. The method as defined in claim 7 wherein said indication is data

9. A method for use in providing information about a call from a network of a local exchange carrier to a network of an interexchange carrier that will carry said call, the method comprising the step of:

supplying a signal from said network of said local exchange carrier to said network of said interexchange carrier indicating that said interexchange carrier was selected to complete said call, said signal being supplied in response to the dialing of the portion of a destination address that indicates an interexchange call and entry of an interexchange access code corresponding to said interexchange carrier.

10. A method for use in a network of a local exchange carrier comprising the steps of:

determining in said network of said local exchange carrier from the dialing of an area code and an access code corresponding to a particular interexchange carrier that said interexchange carrier is to carry said call; and transmitting a signal to said particular interexchange carrier, in response to said determination, said signal indicating that said interexchange carrier's access code was dialed.

11. A method for use in a calling environment in which telephone lines of calling and called parties are connected to respective networks of local exchange carriers and the networks of said local exchange carriers are connected for any long-distance call between a calling party and called party by one of a plurality of networks respectively associated with one of a plurality of interexchange carriers, and where for a call determined to be a long-distance call from a portion of the called party's telephone number a default interexchange carrier is selected to complete said call unless the calling party dialed for said call an interexchange carrier access code so as to particularly select one of said networks of said interexchange carriers to complete said call, the method comprising the step of:

receiving at an interexchange carrier selected by said calling party an indication that said calling party entered said carrier's interexchange access code for said call.

* * * * *